(12) United States Patent
Morris

(10) Patent No.: US 7,481,498 B1
(45) Date of Patent: Jan. 27, 2009

(54) INJECTION-MOLDED WHEEL HAVING A PLURALITY OF RECESSES IN A RIM PORTION

(75) Inventor: Michael A. Morris, Rancho Palos Verdes, CA (US)

(73) Assignee: GEO Plastics, Los Angeles, CA (US)

( * ) Notice: Subject to any disclaimer, the term of this patent is extended or adjusted under 35 U.S.C. 154(b) by 197 days.

(21) Appl. No.: 11/481,442

(22) Filed: Jul. 5, 2006

Related U.S. Application Data

(63) Continuation-in-part of application No. 29/240,855, filed on Oct. 17, 2005, now Pat. No. Des. 542,003.

(51) Int. Cl.
*B60B 5/02* (2006.01)

(52) U.S. Cl. .............................. 301/64.707; 301/64.701; 152/324

(58) Field of Classification Search .............. 301/5.304, 301/6.7, 35.627, 64.701, 64.704, 64.705, 301/64.706 I, 64.707; 152/5, 7, 11, 12, 323, 152/324, 325, 326, 327, 328
See application file for complete search history.

(56) References Cited

U.S. PATENT DOCUMENTS

| | | | | |
|---|---|---|---|---|
| 1,574,499 A * | 2/1926 | Marshall | ..................... | 152/324 |
| 2,167,102 A * | 7/1939 | Burger | ..................... | 301/12.1 |
| 2,684,099 A * | 7/1954 | Henry | ........................ | 152/7 |
| 3,604,756 A | 9/1971 | Gruber | | |
| 3,888,545 A | 6/1975 | Braun | | |
| 3,907,350 A | 9/1975 | Bard | | |
| 3,907,370 A * | 9/1975 | Bard | | |
| 4,170,384 A * | 10/1979 | Rotheiser | ............... | 301/64.707 |
| D328,053 S | 7/1992 | Markling | | |
| 5,167,439 A * | 12/1992 | Green et al. | ................. | 301/5.1 |
| 5,343,916 A * | 9/1994 | Duddey et al. | ................. | 152/5 |
| 6,095,543 A | 8/2000 | McMahon et al. | | |
| 6,361,121 B1 | 3/2002 | Morris | | |
| 6,375,274 B1 | 4/2002 | Morris | | |
| 6,464,305 B2 | 10/2002 | Markling | | |
| D470,452 S | 2/2003 | Flood et al. | | |
| 6,615,885 B1 * | 9/2003 | Ohm | .......................... | 152/11 |
| 6,637,835 B2 | 10/2003 | Morris | | |
| 6,666,526 B1 | 12/2003 | Cummins | | |
| 6,719,027 B1 * | 4/2004 | Chen | ......................... | 152/326 |
| 7,108,335 B2 | 9/2006 | Morris | | |
| 2004/0262984 A1 | 12/2004 | Morris | | |
| 2006/0181141 A1 | 8/2006 | Morris | | |

* cited by examiner

*Primary Examiner*—Russell D Stormer
(74) *Attorney, Agent, or Firm*—Knobbe, Martens, Olson & Bear, LLP

(57) ABSTRACT

A wheel when viewed from the outside having the general appearance of a wheel with a tread pattern. The wheel comprising a hub having a central bore dimensioned and configured to receive an axle, a web extending radially from the hub, and an annular rim encircling the web, the rim including a plurality of deep recesses extending in a transverse direction from an inner surface to an outer surface of the rim, each deep recess having a depth substantially equal to a width of the rim. The wheel further includes a plurality of shallow recesses each having a depth less than the deep recesses.

18 Claims, 6 Drawing Sheets

INJECTION-MOLDED WHEEL HAVING A PLURALITY OF RECESSES IN A RIM PORTION

RELATED APPLICATIONS

This application is a Continuation-in-Part of U.S. Design patent application No. 29/240,855, filed Oct. 17, 2005 and entitled WHEEL, issued as U.S. Pat. No. D542,003 on May 1, 2007, the entire contents of which is incorporated herein by reference.

BACKGROUND OF THE INVENTION

1. Field of the Invention

This invention relates, in general, to wheels and methods for their manufacture thereof, and more particularly, relates to injection molded plastic wheels.

2. Description of Related Art

The use of plastic wheels on a variety of products has dramatically increased in recent years. One area where such plastic wheels have been widely employed is on wheeled refuse or garbage carts or bins of the type commonly employed by homeowners for their trash. Typically, these carts are formed of plastic or other materials and have injection molded, blow molded, rotational molded, or compression molded plastic wheels which are mounted on the ends of a metal axle by a hub member or push-on hat fastener (sometimes referred to as a "pawl nut"). The wheels can also be secured to pre-machined axles with an integrated snap-on lock.

These carts, and the plastic wheels thereon, are typically used in rugged applications and/or in harsh environments. For example, the carts often carry chemical waste and/or heavy loads. The wheels thus may be subject to strong forces and exposed to harsh environments. As such, the wheels for such carts have been manufactured from resilient plastic materials that are able to withstand high forces and maintain a "clean look" after repeated exposure to dirt, grime, trash, chemicals, and other materials that tend to tarnish and degrade the surface of metals. Molded-in plastic dyes also provide a better choice over painted metals in such harsh environments. As such, plastic has become the material of choice over metal and other materials.

Cost-efficiency has also played an increasing role in wheel design. For refuse carts and such other carts that are not carrying fragile materials or passengers, it is preferable to use a single material. The additional step of combining materials (e.g., placing a rubber tread on a plastic wheel) adds complexity, cost, and cycle time to the manufacturing process. Nonetheless, consumers desire a low-cost wheel with ornamental details in addition to functionality.

Performance characteristics also drive wheel design. Manufacturers' desire to reduce costs must be balanced with users' increasing demands for reliable products that maintain a superior look and finish in the face of exacting conditions. As a result, there is a desire to design wheels that achieve the same performance and appearance characteristics but at a lower cost.

Prior methods include blow molding a wheel resembling a tire with tread. The blow molding process allows for manufacturing a product with an intricate pattern and smooth surface. Because blow-molded products generally do not have internal bracing and generally lack superior strength, the blow-molded design may be modified to have curvature or projections instead of planar faces. An example of such a design is shown at U.S. Pat. No. 6,464,305 to Markling. Using both injection and the blow molding process, an ornate wheel may be produced with a separate injection molded tread piece stretched about the outer flange of a preform blow molded rim.

Moreover, blow-molded wheels may lack strength in the hub, outer rim of the wheel, and/or the web portion between the rim to the hub. In general, the outer rim has the important role of stabilizing the wheel when impacting the ground. As such, the outer rim preferably has high-impact strength yet cushions the wheel as it rolls along the ground. Similarly, the intervening structure between the rim and the hub must support the rim. Preferably, the intervening structure is shaped to mimic spokes or create a pattern or design. It also must have good lateral strength.

Prior injection-molded wheels lack the appearance of a wheel having a tire that can be produced with blow-molding. U.S. Pat. No. 3,888,545 to Braun shows an injection molded wheel with projecting fins on an inner face to add additional strength and a tire-like design with little additional material usage. The fins on the outer rim appear as a solid rim with channels cut out, which decreases material usage. The design illustrated by Braun, however, raises several design and processing concerns. Over time, narrow channels on the outer surface of the wheel generally trap dirt and other materials thus detracting from the appearance of the wheel.

The projecting channels may also present manufacturing concerns. At the junction between the nominal wall of the product and the projection there is an increase in thickness. Thus, there is a risk of sinking as the thin ribs cool faster than the surrounding material. Sink marks can be unsightly, especially in comparison to the clean, flat surface of a blow-molded product. Projecting fins also increase the risk of molded-in residual stress, which negatively affects the performance of the wheel.

Sinking may be minimized using packing, gas assist, foaming, and other methods, but the most effective method of reducing the risk of sinking, deformation, and molded-in stress is to maintain proportionality and uniform wall thickness throughout the part. When using ribs, it is thus preferable to avoid long and tall shapes with minimal thickness like the wheel design taught by Braun. Such a design likely leads to heat deflection and other problems detracting from the overall appearance of the product.

U.S. Pat. No. 6,095,543 to McMahon et al. shows a front wheel having an annular rim with an integral wheel web. The wheel web includes a multiplicity of ribs forming recesses on each side of the wheel. The recesses are pattern-shaped and extend transversely on each side of the wheel to form an outer face of the rim. Although these ribs may form a pleasing design, they also lead to the trapping of unsightly dirt on the face of the wheel. Additionally, a user viewing this wheel does not see a pleasing smooth surface that is typically associated with blow molding.

Thus there is a need for a wheel having favorable performance characteristics and a pleasing outer appearance. What is needed is a wheel with ornamental details resembling a conventional tire-mounted-on-a-wheel configuration with the performance of a reinforced injection molded wheel. Further, the wheel preferably has a design minimizing the risk of manufacturing defects. Specifically, what is needed is a high-performance injection molded wheel that has the visual appearance of a blow-molded product from the outside.

BRIEF SUMMARY OF THE INVENTION

In summary, one aspect of the present invention is directed to a wheel including a hub having a central bore dimensioned and configured to receive an axle, a web extending radially from the hub, and an annular rim encircling the web. The rim includes a plurality of deep recesses extending in a transverse direction from an inner surface to an outer surface of the rim, each deep recess having a depth substantially equal to a width of the rim.

The plurality of deep recesses may have L-shaped cross-sections. The web may be monolithically formed with the hub and annular rim. The outer ends of the plurality of deep recesses may be shaped to form a pattern on an outer surface of the wheel. The web includes a locator pin on an inside surface. The wheel may be formed by injection molding.

Each deep recess may have a radial upright wall having a raised portion adapted for impact with a ground surface. Each deep recess further may include a peripheral wall, radial sidewalls and an outer wall, wherein the peripheral wall, radial sidewalls and outer wall may be configured to appear as tread knobs on a tire.

The wheel may further include a plurality of shallow recesses each having a depth less than the deep recesses. The shallow recesses each may have a depth greater than or equal to half the width of the rim. The plurality of shallow recesses and the plurality of deep recesses may be contiguous and alternating. Each shallow recess may include an outer wall surface having another raised portion adapted for impact with a ground surface. The raised portion and another raised portion may be configured to appear as a central raised bead encircling the rim. The deep recess may include a peripheral wall, radial sidewalls and an outer wall. The shallow recess may include an outer wall inwardly displaced from that of the outer wall of the deep recess. The shallow recesses and deep recesses both extend outwardly through a circumferential plane of the rim.

Each of the plurality of deep recesses may include a wide bottom foot portion and adjoining upright leg portion extending radially outward from the foot portion, the leg portion being narrower than the foot portion. Each of the plurality of shallow recesses may be positioned radially outward of a respective foot portion, the shallow recesses being contiguous to the respective foot portion and a respective leg portion. In one embodiment, an outermost wall of the leg portions and another outermost wall of the shallow recesses defines a radial outer surface of the wheel.

The web may be a corrugated member extending continuously around the hub. The web may include inner and outer portions parallel to a plane of the wheel and proximate to the inner and outer surfaces of the wheel. The hub may include radially extending ribs and wherein each inner portion may be substantially centered over respective rib.

Another aspect of the present invention is directed to a wheel including a hub having a central bore configured for insertion of an axle therethrough from an inner surface to an outer surface of the wheel, the hub including ribs extending radially from the central bore, an annular rim encircling the hub, a continuous web interconnecting the hub and the annular rim, wherein the web may be formed by a continuous corrugated surface defining a plurality of corrugations about the hub, the corrugations each having transverse portions and a bridging crown portion, the transverse portions opposing each other about the crown portion, each of the crown portions being substantially centered about a respective rib.

The wherein the corrugations may be symmetrically positioned about the hub. The crown portions may be substantially planar. The crown portions lie in a plane proximate to the inner face of the wheel. The crown portions lie in a plane proximate to the outer face of the wheel.

A further aspect of the present invention is directed to method of injection molding a wheel including the steps of providing a mold having a cavity configured to mold a wheel, the wheel having a hub, a web extending radially from the hub, and an annular rim encircling the web, the rim being formed by a plurality of deep recesses extending transversely from the inner surface of the wheel, the plurality of deep recesses having depth substantially equal to a width of the rim wherein said mold cavity may include a projection having a shape complementary to the deep recesses, and injecting molten wheel material into the mold, and ejecting the material from the mold.

The plurality of deep recesses may have L-shaped cross-sections. The method may further include a plurality of shallow recesses each having a depth less than the deep recesses. The shallow recesses each may have a depth greater than or equal to half the width of the rim. The plurality of shallow recesses and the plurality of deep recesses may be contiguous and alternating.

The apparatus and method for molding a wheel of the present invention has other features and advantages which will be apparent from or are set forth in more detail in the accompanying drawings, which are incorporated in and form a part of this specification, and the following Detailed Description of the Invention, which together serve to explain the principles of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

For convenience in explanation and accurate definition in the appended claims and detailed description, the terms "up" or "upper", "down" or "lower", "inside" and "outside" are used to describe features of the present invention with reference to the positions of such features as displayed in the figures.

Figure 1:
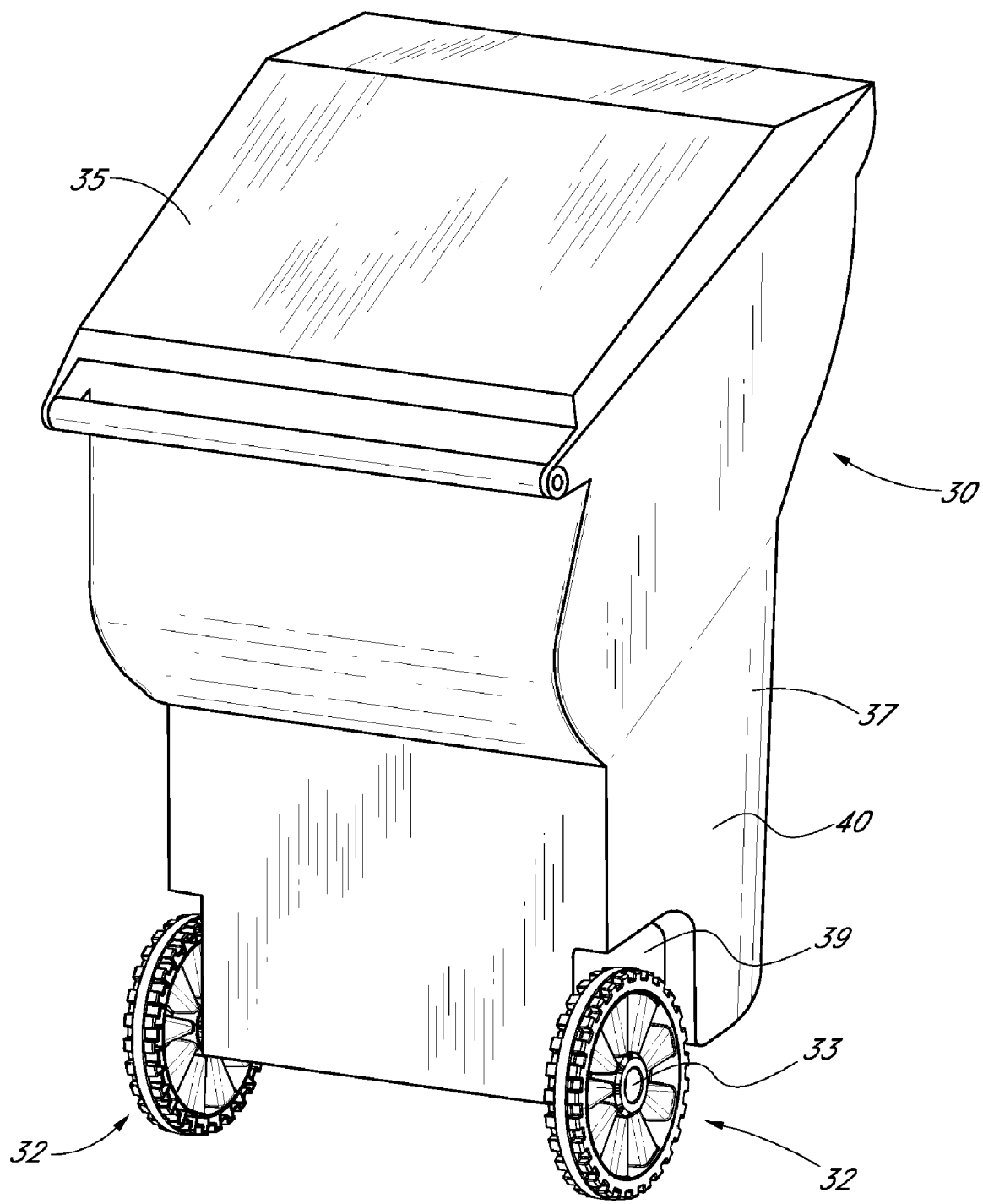
FIG. 1 is a front view of a wheel in accordance with the present invention, the wheel mounted on a cart.

The wheel and method of molding a wheel of the present invention can be used in connection with numerous wheeled devices including refuse carts, wheeled coolers, wagons, wheeled toys, barbecues or the like. A typical, but not limiting, application is to employ the same in a wheeled refuse cart of the general type shown in FIG. 1. Thus, cart 30 includes two wheels 32 mounted on an axle 33. A hinged lid 35 optionally can be provided. The cart can be tilted or tipped about the wheels so as to enable rolling of the cart for the transport of refuse, for example, between a location for filling the cart and a location for pickup.

In the refuse cart illustrated, body 37 of cart 30 includes a wheel well area designed to receive each wheel 32. When viewing cart 30 with a wheel well 39 from the side, a user can see the entire outer face of wheel 32, but a portion of an inside face of the wheel is obscured by the cart body (best seen in FIG. 1). The wheel well may serve to protect the wheel and may be utilized as a cosmetic choice enabling the outer wheel surface to be substantially flush with an outer wall 40 of body 37. Many carts, however, do not include wheel wells. Similar wheeled products which generally are smaller in size include wagons, wheeled food and beverage coolers, barbecues, and wheeled toys. Again, wheels 32 may sit in a well or substantially flat against an outside wall of the device, but in most cases, the wheels will be against the body of the cart with one side partially obscured.

Figure 2:
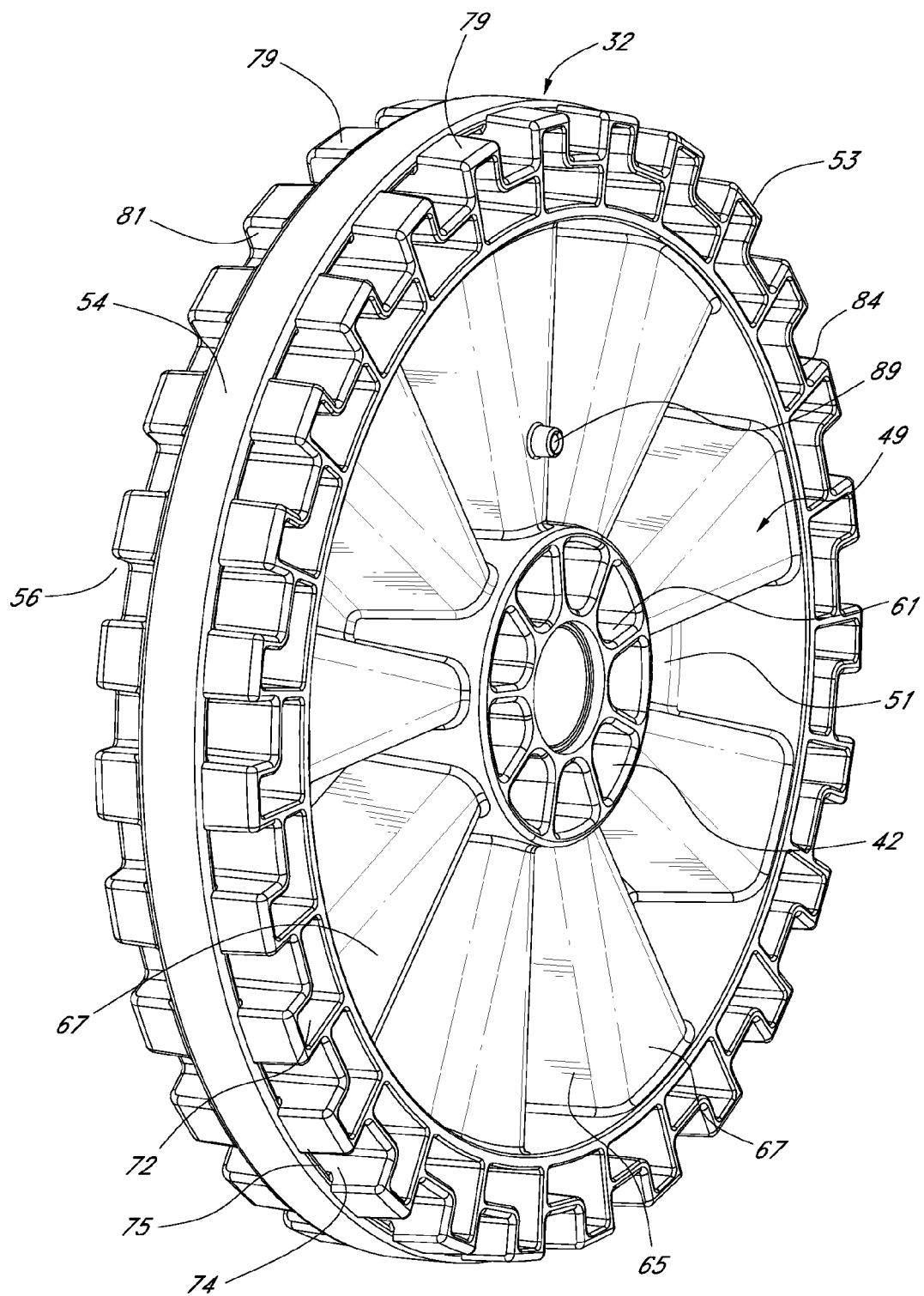
FIG. 2 is perspective rear view of a wheel in accordance with the present invention.
Figure 3:
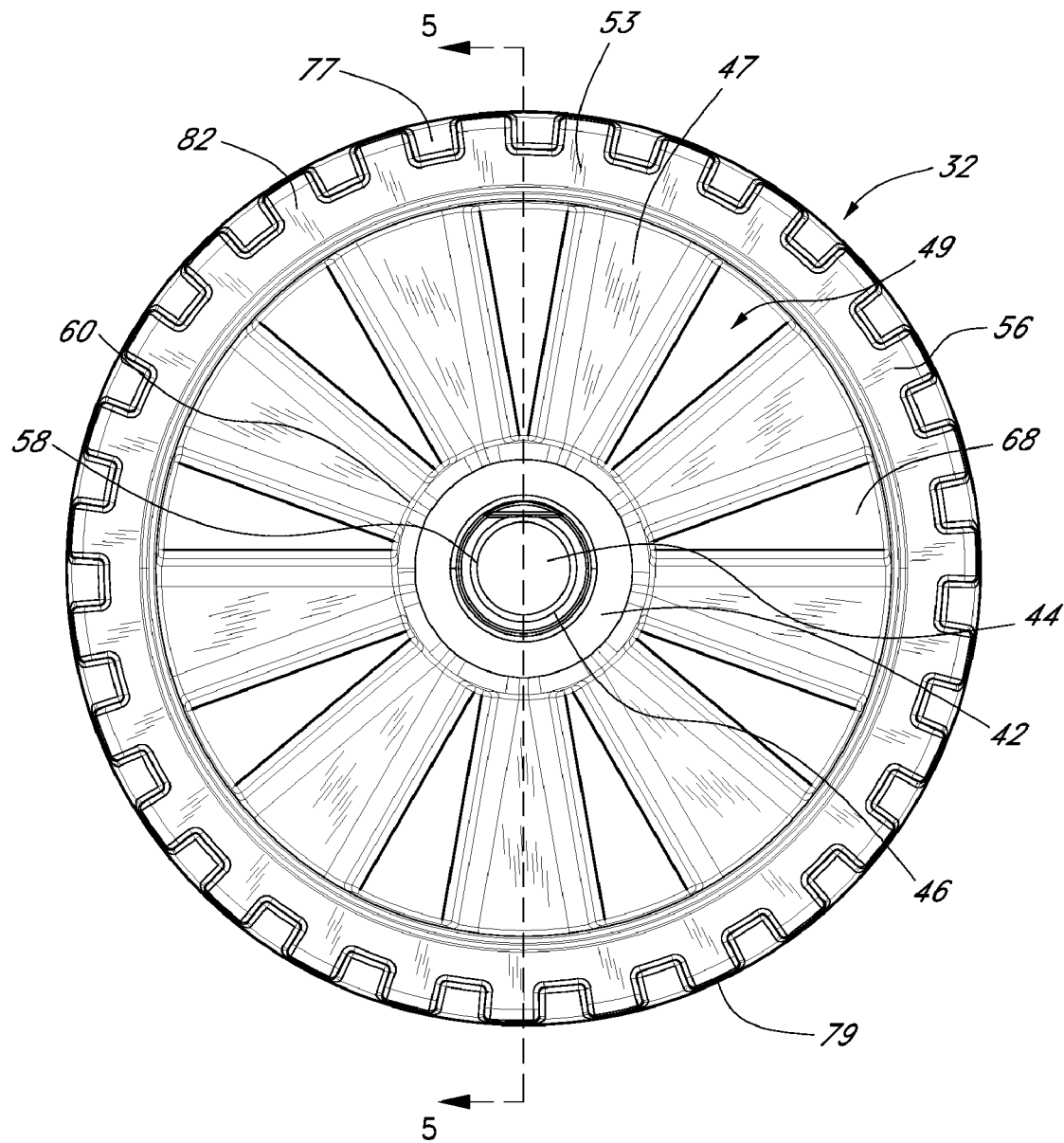
FIG. 3 is a front view of the wheel of FIG. 2.

Turning now to FIGS. 2-6, the outside of wheel 32 has the general appearance of a multiple-component wheel with a rubber tread surface, as best seen in FIG. 3. Viewed from the outside, as depicted in FIG. 3, a hub 42 has a smooth outer radial surface and a bore 44 through the center. The bore is configured to receive the axle 33 or an axle sleeve of the snap-on type described in Applicant's U.S. Pat. Nos. 6,361, 121, 6,375,274, and 6,637,835, U.S. Patent Application Publication No. US 2004/0262984 A1, and U.S. patent application Ser. No. 11/059,153, the entire contents of which patents and patent applications are incorporated herein by this reference. The bore typically includes a lip 46 in the inner diameter for receiving an end of such a snap-on insert in an otherwise conventional manner.

A web 47 extends radially from hub 42. As illustrated in FIG. 3, the web appears to have nine spoke-like corrugations 49 projecting outward from an inner surface or back wall 51. Although nine corrugations are shown, any number of corrugations 49 or shapes may be used. As will be discussed, in the preferred embodiment the number of corrugations should correspond to the hub construction. Furthermore, the corrugations are preferably evenly-spaced, circumferentially about the hub in a symmetrical configuration. This ensures balanced support and smooth rolling of the wheel. One will appreciate that asymmetric configurations may also be used.

Along the outer circumference of web 47 is an annular rim 53. In the illustration, the annular rim has a smooth central raised bead 54 with knobs 56, as best seen in FIG. 2. One will appreciate that the appearance of an annular rim by texturing the area separately from and/or differently than the rest of the wheel. The knobs give the appearance of tire tread along the periphery of the wheel. As can be seen in FIG. 3, the outer face of wheel 32 has an aesthetically pleasing smooth and detailed appearance similar to a blow-molded wheel and resembling a conventional tire and rim configuration.

Figure 4:
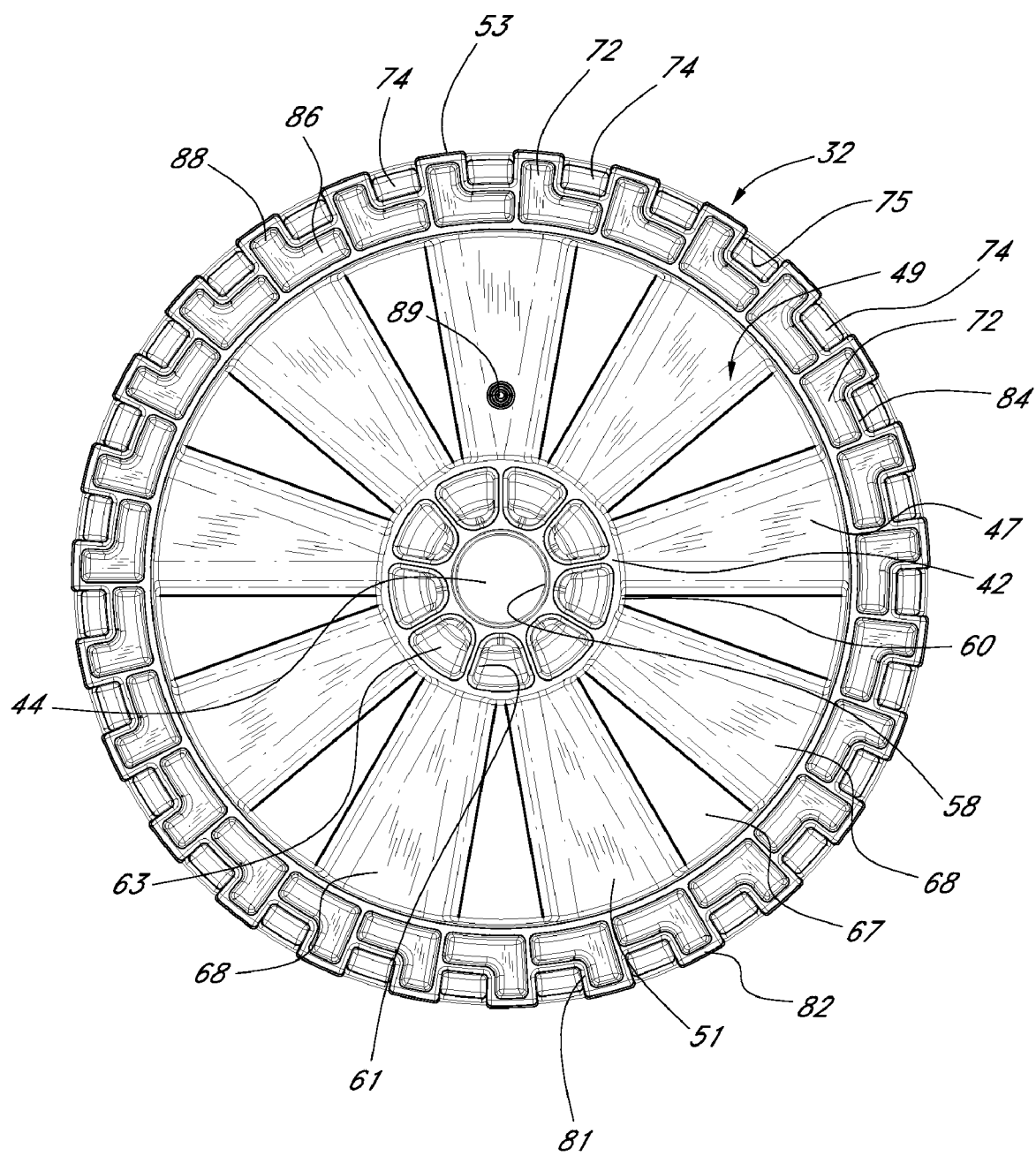
FIG. 4 is a rear view of the wheel of FIG. 2.
Figure 5:
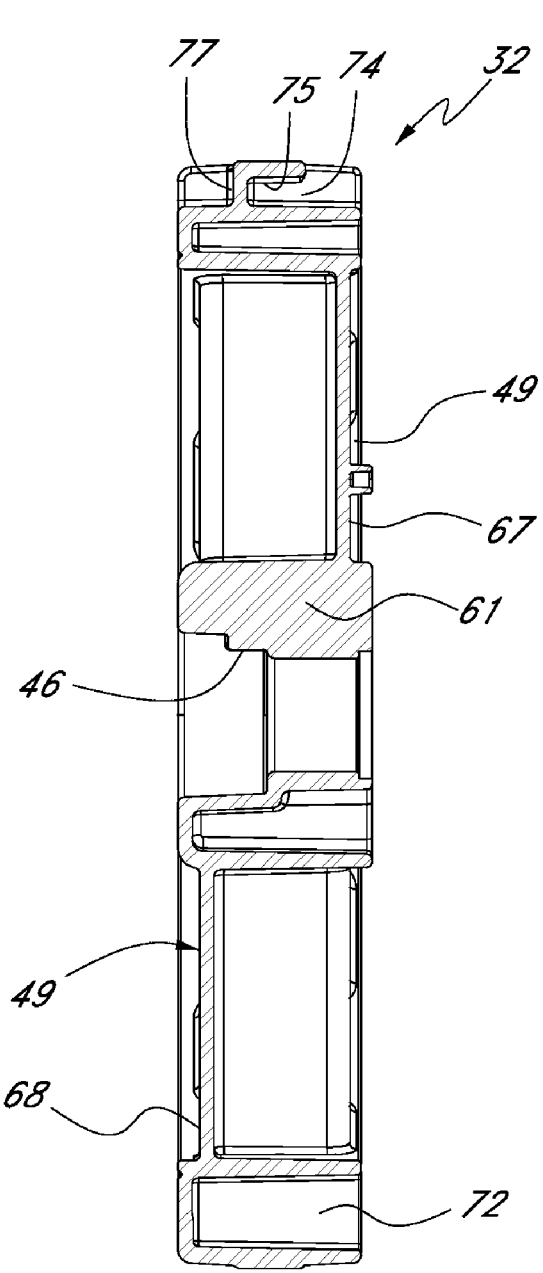
FIG. 5 is a cross-sectional view of the wheel of FIG. 2 taken substantially along the line 5-5 of FIG. 1.
Figure 6:
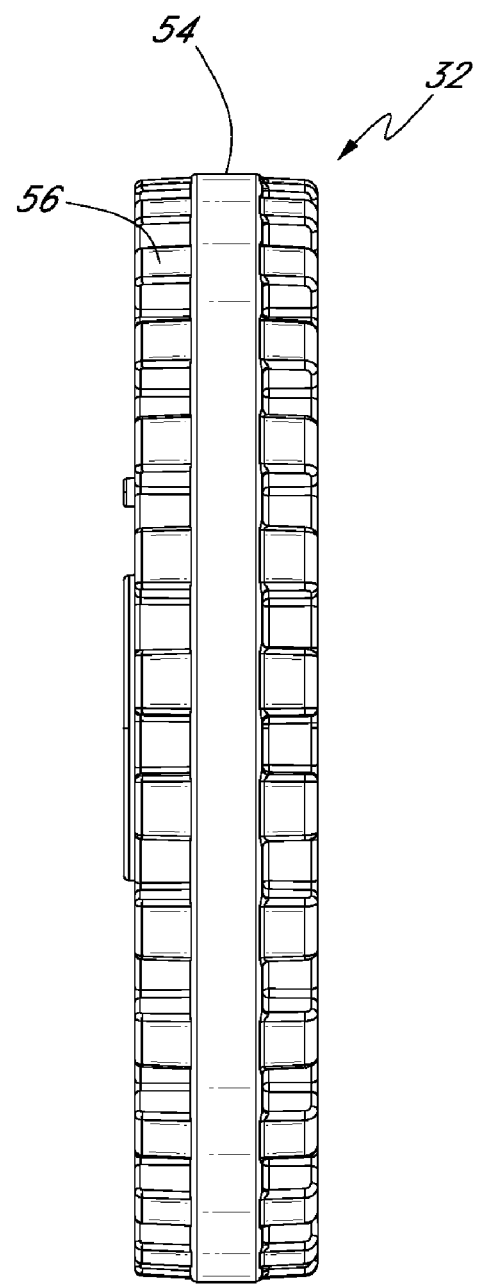
FIG. 6 is a side view of a wheel of FIG. 2.

Turning to FIG. 4, a backside or inside of wheel 32 is shown. Hub 42 has an inner diameter 58 and outer diameter 60. Bore 44 passes in a transverse direction along a central axis of the inner diameter. The hub has a series of ribs 61 extending radially from the inner diameter to the outer diameter. The ribs allow the hub structure to provide support to the remainder of the wheel during loading. The ribs are preferably evenly spaced about the central axis and form hub recesses 63 that are approximately equal in depth to the width of hub 42.

Web 47 interconnects hub 42 and rim 53. In the preferred embodiment illustrated in FIGS. 2-4, the web is a continuous corrugated member having circumferentially-spaced corrugations 49 arranged in a spoke-like pattern. The corrugations are preferably symmetrically and evenly-spaced about the hub. Each corrugation is formed by a transverse portion 65 projecting outward from a back wall 51 and interconnecting an inner crown portion 67 with a respective outer crown portion 68, each crown portion lying in a plane parallel to the outer face of wheel 32. Each inner crown portion 67 (best seen in FIG. 4) includes a pair of adjacent transverse portions 65 extending outwardly to respective outer crown portions 68 (best seen in FIG. 2). The crown portions are substantially planar and have a tapering shape from the rim to the hub. The intersecting edge of the transverse portions and crown portions preferably has a rounded or chamfered shape to reduce stress in the piece during molding and to provide a smooth appearance on the wheel surface.

In the preferred embodiment, the backside of the web has an inverse appearance to the front. The corrugations 49 on the backside of the wheel correspond to the corrugations on the front side and vice versa (best seen in FIG. 5). This is achieved by setting the radial width of outer crown portions 68 equal to the radial width of the space between inner crown portions 67 them on back wall 51. Thus, web 47 is shaped like a corrugated sheet or ribbon about hub 42.

It is understood that the corrugations do not have to be substantially pyramidal-shaped and symmetrically-spaced. For example, web 47 may have a series of corrugations 49 having radial widths greater than or less than the space between them. The corrugations may also have shapes configured to produce a desired visual shape, pattern, or image on the opposite side of wheel 32. The use of symmetrically-space corrugations with substantially flat sides, however, maximizes the support of web 47 and hub 42. Not only does this configuration create a pleasing design, but the transverse portions 65 and crown portions 68 of corrugations 49 also mutually reinforce each other. If the web were formed merely with transverse portions 65 between the hub and rim, the transverse portions would be more susceptible to deflection or buckling under loading. Likewise, the supporting transverse portions 65 provide lateral support to the crown portions and wheel 32. Additionally, the perpendicular surface configuration provides enhanced support in all directions.

In the illustrated embodiment, the center of crown portions 68 is substantially centered over respective ribs 61 of hub 42. Thus, the number of ribs 61 corresponds to the number of crown portions. In this manner, the forces on annular rim 53 are directed through corrugations 49 and supported by ribs 61 of the hub. Because the force is directed in line with the ribs, torsion or moment forces about the ribs are minimized and ribs 61 are less likely to deflect. Likewise, opposing forces from hub 42 through each rib 61 is supported at a center of a respective a crown portion 68. This balanced configuration increases the overall strength of the wheel with minimal material use. The configuration also provides a desired balance between rigidity and shock absorption.

Figure 7:
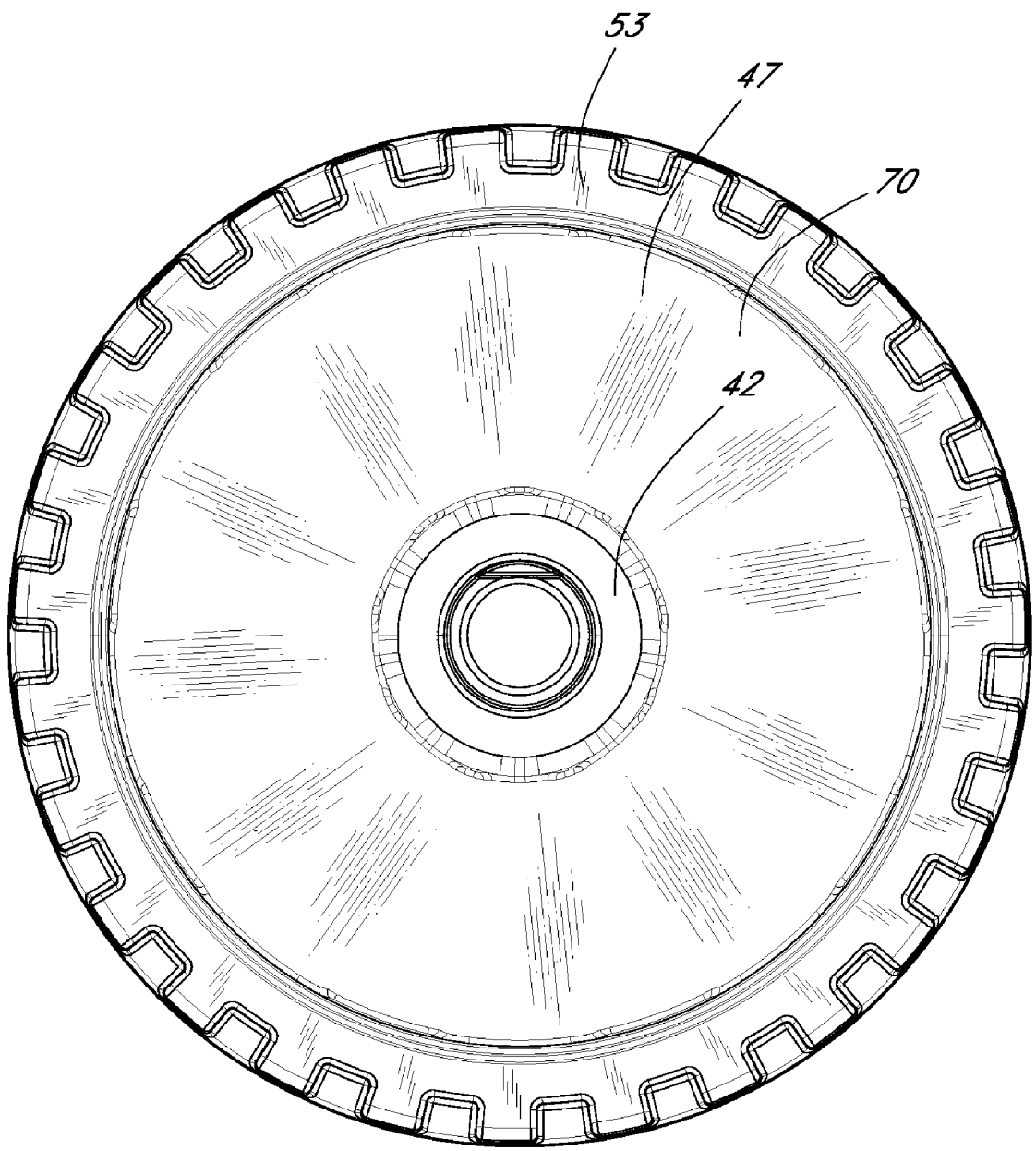
FIG. 7 is a front view of another wheel in accordance with the present invention.

In the alternative embodiment shown in FIG. 7, web 47 is formed with a sinuous or corrugated member 70. The shape of the web is a matter of aesthetic preference and manufacturing specifications. As an example, a sinuous shape may allow for improved filling of the mold depending on the number of gates and gate type, location, and size, but it may also require the elimination or modification of ejection points. Similar to the preferred embodiment, however, the center or peak and valley of sinuous member 70 preferably is substantially centered about a respective rib 61. Other designs for web 47 are also envisioned including the formation of images, writing, and other patterns.

As already discussed, and with reference to FIGS. 2 and 4, annular rim 53 encircles web 47. As seen from a backside of wheel 32, the rim is formed by alternating series of contiguous recesses. The recesses or voids are formed by inwardly projecting rib formations. Along the circumference of the rim, a plurality of deep recesses 72 alternate with a plurality of shallow recesses 74 having a depth less than the deep recesses. The deep recesses 72 have a cavity depth substantially equal to the width of the rim less wall thickness at the bottom of the recess. In the preferred embodiment, the plurality of shallow recesses have a depth greater than or equal to half the width of rim 53. Along the periphery of wheel 32, in a transverse direction, each of the shallow recesses 74 and deep recesses 72 extend inwardly from an outside surface through a central circumferential plane of the rim. Thus, at ends opposite to the inner side, an outer wall of the shallow recess is inwardly offset from the outer wall of the deep recess. In the illustrated embodiment, the outer walls of the shallow recesses are offset approximately 0.25 to 0.5 inches inward from central bead 54. One will appreciate that the actual dimensions may vary.

With continuing reference to FIG. 4, the shallow recesses preferably have an outer wall 75 with a raised portion adapted for impact with a ground surface, and an outside wall 77 contributing to the clean exterior surface of the wheel. The raised portion of outer wall 75 of shallow recesses 74 and a raised portion of deep recesses 72 are configured to appear as a central raised bead 54 encircling rim 53. In the preferred embodiment, the deep recesses include a peripheral wall 79, radial sidewalls 81, and an outer wall 82 that appear as tread knobs 56. Thus, as illustrated, the outer surface of rim 53 has a continuous contact surface down the central circumference and mimics the appearance of tire tread. In the illustrated embodiment, the raised portion of the deep recesses and shallow recesses are equal such that both support loading of the wheel. It is understood, however, that the actual configuration may vary according to desired cushioning and rigidity specifications.

In the illustrated embodiment, rim 53 has a rib structure providing increased transverse and radial support. The inner face of rim 53 is split into uniform sections by ribs extending radially from the outside of web 47 to the outside of the rim. Each section is split further by intermediate rib 84 to form deep recess 72 and shallow recess 74. The shallow recesses have an approximately rectangular, almost square cross-sectional shape, however, one will appreciate that the shallow recesses may have other shapes, such triangular, wherein one wall forms a portion of the central bead. Each of the deep recesses 72 has a bottom foot portion or cavity 86 and an upright leg portion or cavity 88. The foot portion has a substantially rectangular cross-section in a circumferential dimension along the periphery of web 47. Thus, the radial height of the foot portion is less than the circumferential width. Leg portion 88 extends radially from the foot portion 86. The leg portion has a narrower circumferential width than foot portion 86. Each of the plurality of shallow recesses 74 is positioned radially outward of a respective foot portion 86 of deep recesses 72 and contiguous to the foot portion and leg portion 88.

In the illustrated embodiment, the sum of the circumferential width of each of the shallow recesses 74 and the leg portion 88 together is approximately equal to the width of the foot portion 86. Similarly, the sum of the radial height of each of the shallow recesses 74 and foot portion 86 together is approximately equal to the overall height of each of the plurality of deep recesses 72 or radial sidewall 81. One will appreciate that other configurations may be used in which the shallow recess radially extends outside or inside of the peripheral wall of the leg portion. Also, one will appreciate that one or more shallow recesses may be provided between adjacent leg portions.

As best seen in FIG. 3, the rim 53 is thus formed by successive deep recesses 72 having an "L"-shaped cross-section and contiguous shallow recesses. Further, an outermost peripheral wall or distant radial end of the leg portions and an outermost peripheral wall of the shallow recesses define a radial outer surface of rim 53 and wheel 32. In this configuration, the rim structure has increased strength in compression and the length to thickness ratio of the ribs is minimized. Moreover, the backside of the deep and shallow recesses on the outer side of the wheel has the desired appearance. One will appreciate that other configurations may be used such as a "U"-shape, or "I"-beam shape. In the illustrated embodiment, the depth of the shallow recesses is less than half the depth of the deep recesses. One will, however, appreciate that the depth of the shallow recesses may also be equal to or greater than half the depth of the deep recesses.

In operation and use, as wheel 32 rolls on a surface, compressive force is applied to deep recesses 72 and shallow recesses 74 of annular rim 53. Being along the center of impact, the central bead 54 formed by the deep recesses and shallow recesses remains in continuous contact with the ground surface whereas knobs 56 intermittently make contact. Radial sidewalls 81 and intermediate rib 84 support peripheral wall 79 of the deep recesses when contacting the ground. The radial sidewalls 81 further provide lateral or transverse stability to the wheel 32 in addition to supporting the load.

Intermediate rib 84, which separates the deep recess from the shallow recess, further supports radial sidewall 81, effectively minimizing the ratio of height to nominal thickness of the sidewall. As one in the art will appreciate, this configuration increases strength with efficient use of materials and also helps to avoid problems in the molding process. In particular, warping, molded-in stress, insufficient fill, and other problems can be minimized.

Turning now to the manufacture of wheel 32, it is understood that the above invention is generally applicable to wheels formed in part or in whole by injection molding. In the preferred embodiment, web 47 is monolithically formed with hub 42 and annular rim 53. It is understood that the present invention can equally be applied to other manufacturing processes such as machining and welding multiple parts formed by separate processes. The present invention is particularly suited for injection molding, which is generally faster, and cheaper than such other methods. Although the wheel 32 is shown and described as a single, integral piece, it will be appreciated that an elastomer or other material may be applied to or stretched about the rim in applications requiring special wheel traction or shock absorption. Other pieces may also be combined with the wheel described for other particular applications.

The injection molding process requires the step of filling a mold with a cavity configured to mold the wheel 32 described. The plastic is cooled and the finished piece is ejected after the mold is opened. The molding process may be performed in one or multiple steps forming different sections of the wheel. Likewise, the wheel may be formed of multiple materials. The wheel material preferably has a similar or identical material to the device to which it is attached. The wheel may be formed of any moldable material, but preferably a thermoplastic or thermoset plastic is used in applications requiring greater hardness and durability. Other materials, such as moldable wood and elastomerics, are also contemplated.

As understood in the art, and clearly shown in FIGS. 2 and 4, a locator 89 may optionally be formed on the inner surface of web 47 for positioning the wheel during assembly when used in combination with a snap-on insert. The locator is particularly useful in aligning the wheel when assembled with a snap-on insert of the type described in the above-mentioned U.S. Pat. Nos. 6,361,121, 6,375,274, and 6,637,835, U.S. Patent Application Publication No. US 2004/0262984 A1, and U.S. patent application Ser. No. 11/059,153. An additional advantage of the design of the web discussed is that crown portions 67 provide a good surface for opposing ejector pins in that the surface is substantially perpendicular to the motion of the pins.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

The invention claimed is:

1. A wheel comprising:
a hub having a central bore dimensioned and configured to receive an axle or an axle sleeve;
a web extending radially from the hub;
an annular rim encircling the web, the rim including a plurality of deep recesses extending in a transverse direction from an inner surface to an outer surface of the rim, each deep recess having a depth substantially equal to a width of the rim; and
a plurality of shallow recesses each having a depth less than the deep recesses, wherein the shallow recesses and deep recesses both extend outwardly through a circumferential plane of the rim.

2. The wheel according to claim 1, wherein the plurality of deep recesses have L-shaped cross-sections.

3. The wheel according to claim 1, wherein the web is monolithically formed with the hub and annular rim.

4. The wheel according to claim 1, wherein outer ends of the plurality of deep recesses are shaped to form a pattern on an outer surface of the wheel.

5. The wheel according to claim 1, wherein the web includes a locator pin on an inside surface.

6. The wheel according to claim 1, wherein the wheel is formed by injection molding.

7. The wheel according to claim 1, wherein each deep recess has a radial upright wall having a raised portion adapted for impact with a ground surface.

8. The wheel according to claim 7 wherein each deep recess further includes a peripheral wall, radial sidewalls and an outer wall, wherein the peripheral wall, radial sidewalls and outer wall are configured to appear as tread knobs on a tire.

9. The wheel according to claim 1, wherein the shallow recesses each have a depth greater than or equal to half the width of the rim.

10. The wheel according to claim 1, wherein the plurality of shallow recesses and the plurality of deep recesses are contiguous and alternating.

11. The wheel according to claim 1, wherein each shallow recess includes an outer wall surface having a raised portion adapted for impact with a ground surface.

12. The wheel according to claim 11 wherein the raised portion and another raised portion are configured to appear as a central raised bead encircling the rim.

13. The wheel according to claim 11, wherein the deep recess includes a peripheral wall, radial sidewalls, and an outer wall, wherein each said shallow recess includes an outer wall inwardly displaced from the outer wall of the deep recess.

14. The wheel according to claim 1, wherein the web is a corrugated member extending continuously around the hub.

15. The wheel according to claim 14 wherein the web includes inner and outer portions parallel to a plane of the wheel and proximate to the inner and outer surfaces of the wheel.

16. The wheel according to claim 15 wherein the hub includes radially extending ribs and wherein each inner portion is substantially centered over respective rib.

17. A wheel comprising:
a hub having a central bore dimensioned and configured to receive an axle or an axle sleeve;
a web extending radially from the hub;
an annular rim encircling the web, the rim including a plurality of deep recesses extending in a transverse direction from an inner surface to an outer surface of the rim, each deep recess having a depth substantially equal to a width of the rim; and
a plurality of shallow recesses each having a depth less than the deep recesses, wherein each of the plurality of deep recesses includes a wide bottom foot portion and adjoining upright leg portion extending radially outward from the foot portion, the leg portion being narrower than the foot portion, wherein each of the plurality of shallow recesses is positioned radially outward of a respective foot portion, the shallow recesses being contiguous to the respective foot portion and a respective leg portion.

18. The wheel according to claim 17 wherein an outermost wall of the leg portions and another outermost wall of the shallow recesses defines a radial outer surface of the wheel.

* * * * *